Figure 1:
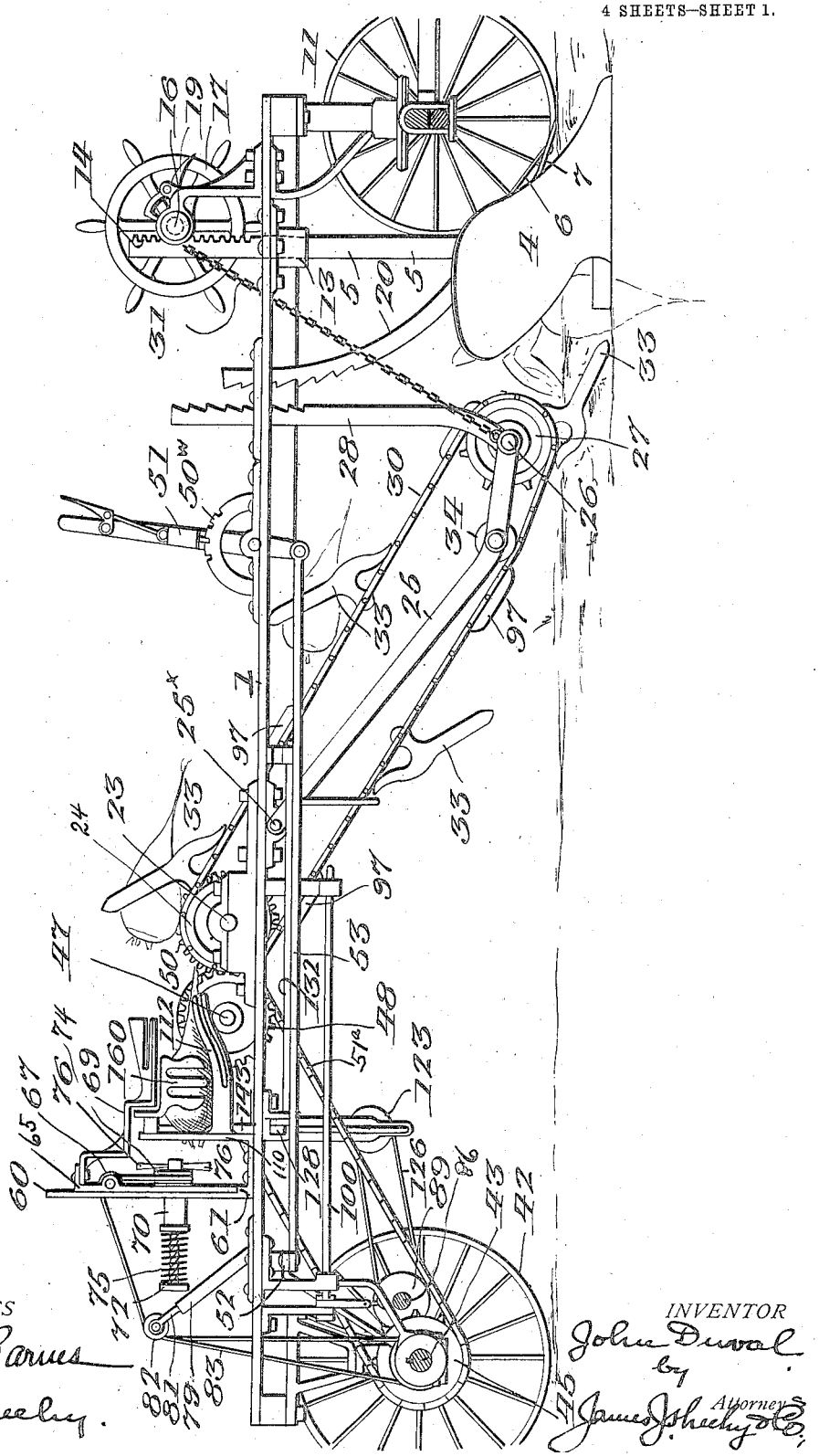

J. DUVAL.
BEET HARVESTER.
APPLICATION FILED FEB. 18, 1913.

1,076,411.

Patented Oct. 21, 1913.
4 SHEETS—SHEET 1.

WITNESSES
Philip E. Barnes
E. J. Sheehy

INVENTOR
John Duval
by
James J. Sheehy
Attorney

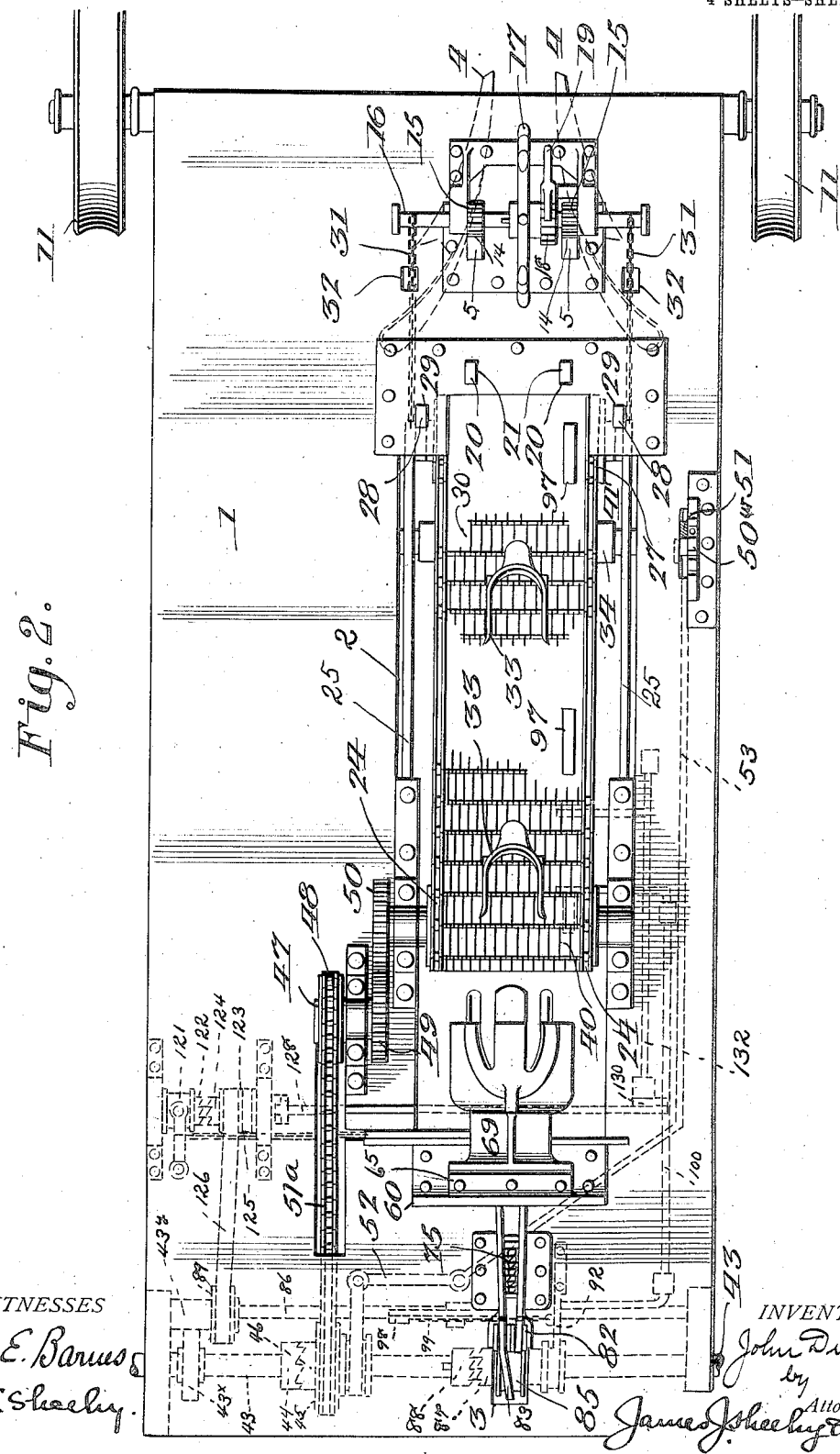

J. DUVAL.
BEET HARVESTER.
APPLICATION FILED FEB. 18, 1913.
1,076,411.
Patented Oct. 21, 1913.
4 SHEETS—SHEET 3.
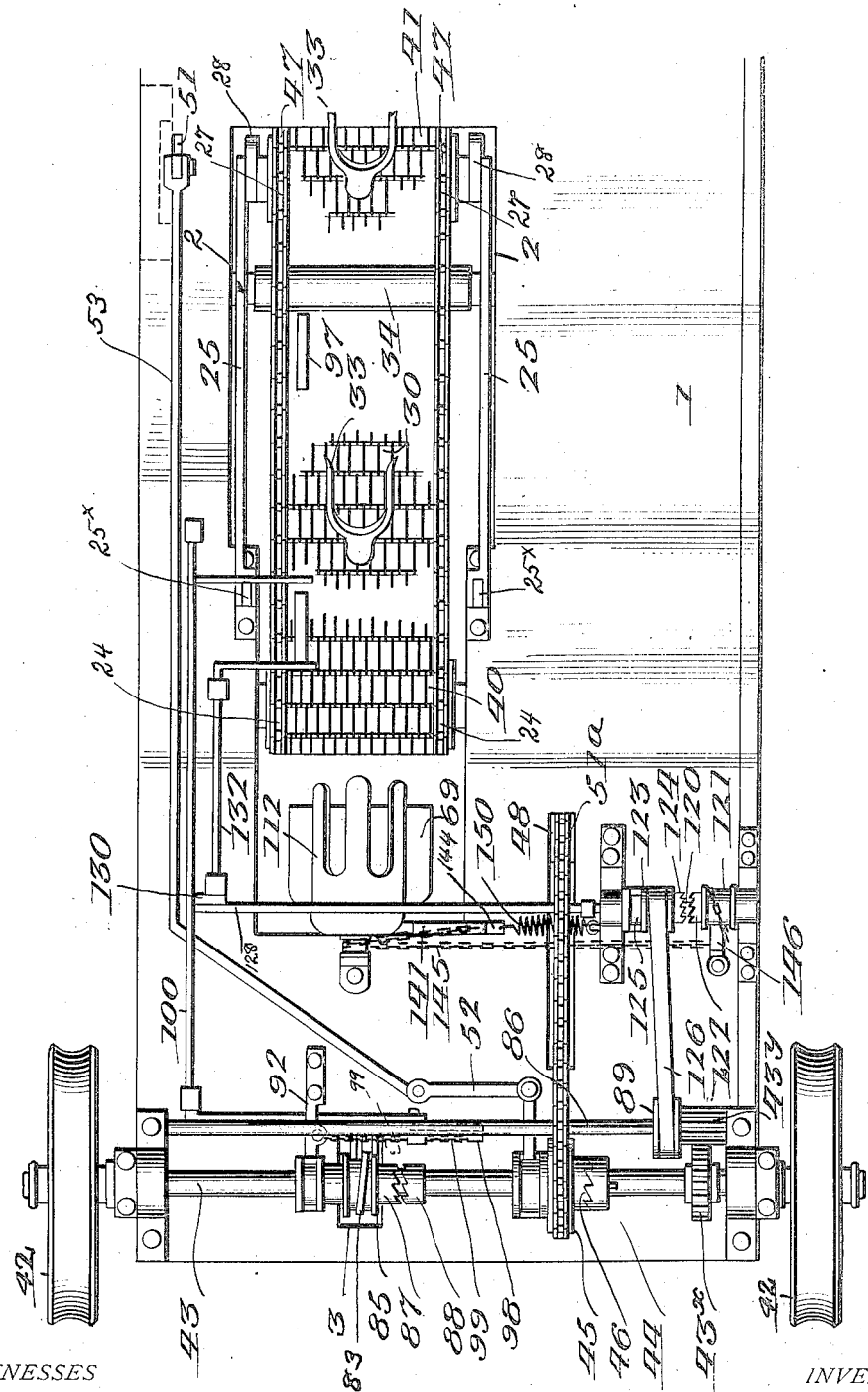
WITNESSES
Philip E. Barnes
E. J. Sheehy.
INVENTOR
John Duval
by
James J. Sheehy & Co., Attorneys J. DUVAL.
BEET HARVESTER.
APPLICATION FILED FEB. 18, 1913.
1,076,411.
Patented Oct. 21, 1913.
4 SHEETS—SHEET 4.
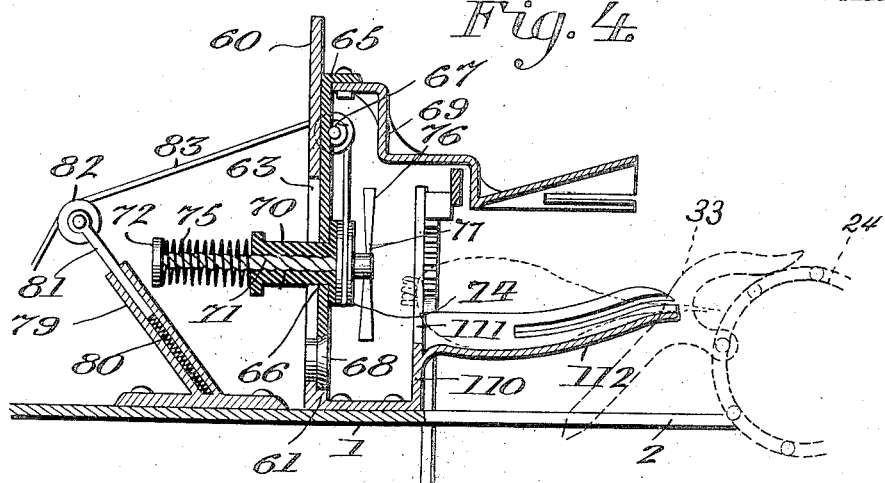
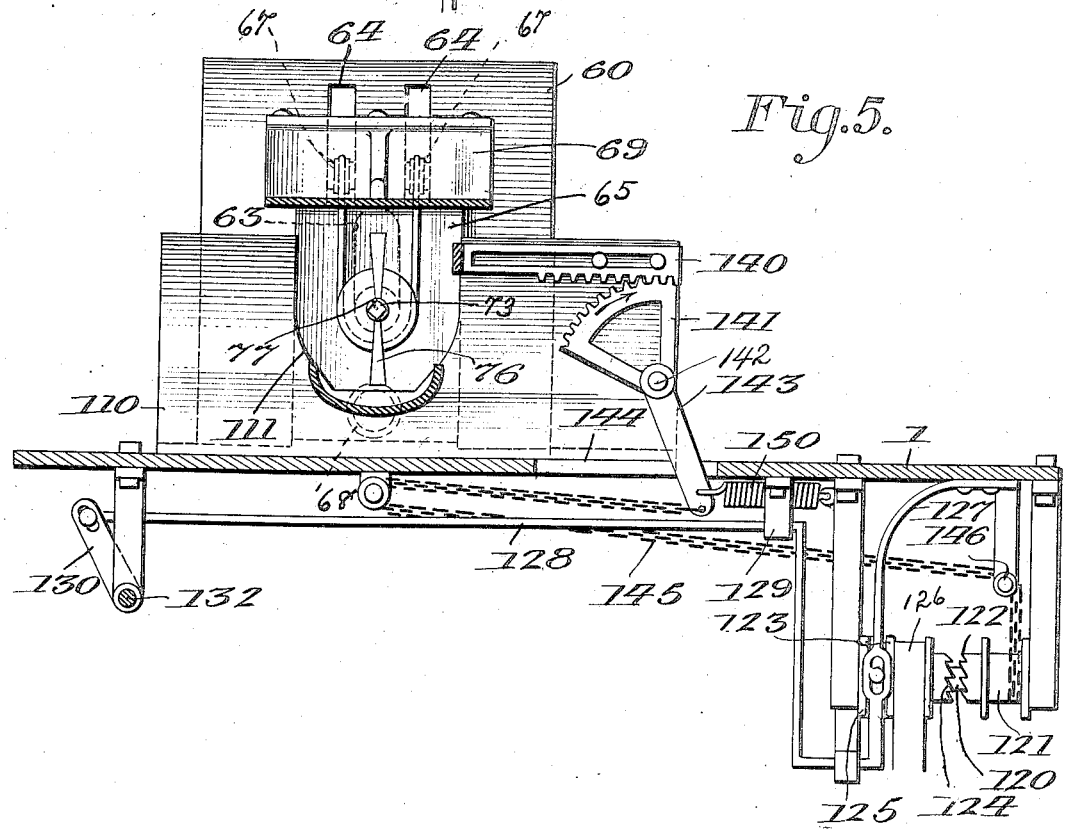
WITNESSES
Philip E. Barnes
E. T. Sheehy.
INVENTOR
John Duval
by James J. Sheehy, Attorneys.

UNITED STATES PATENT OFFICE.

JOHN DUVAL, OF GRAND JUNCTION, COLORADO.

BEET-HARVESTER.

1,076,411. Specification of Letters Patent. Patented Oct. 21, 1913.

Application filed February 18, 1913. Serial No. 749,147.

*To all whom it may concern:*

Be it known that I, JOHN DUVAL, a citizen of the United States, residing at Grand Junction, in the county of Mesa and State of Colorado, have invented new and useful Improvements in Beet-Harvesters, of which the following is a specification.

My present apparatus pertains to machines for harvesting beets; and it contemplates the provision of a simple, practical and efficient machine for taking beets from the ground, elevating the beets, and cutting the tops from the same, in the order named, as the machine is moved forward.

The present and best practical embodiment of my invention of which I am cognizant will be understood in all of its details from the following description and claims when the same are read in connection with the drawings, accompanying and forming part of this specification, in which:

Figure 1 is a side elevation of the best practical embodiment of my invention that I have as yet devised. Fig. 2 is a broken plan of the same. Fig. 3 is a broken inverted plan showing the driving connections at the underside of the body. Fig. 4 is an enlarged detail longitudinal vertical section illustrative of the relative arrangement of the beet cup, the hood, the beet displacing means, the beet topping means, the means for controlling the forward and backward movements of the topping means, and the driving connection for rotating the topping means. Fig. 5 is an enlarged transverse section taken through the cup and the hood above the cup, looking rearwardly, and showing the beet displacing means and the means through the medium of which said displacing means are intermittently actuated.

Similar reference numerals designate corresponding parts in all of the views of the drawings.

Among other features, my novel machine comprises a body 1, provided with openings 2 and 3, and supported by wheels, as shown or by other supporting means compatible with the purpose of the invention.

Arranged below the forward portion of the body 1, in a plane at one side of the longitudinal center thereof, are spaced plows 4, carried by standards 5; the mold boards of the plows being outermost, and the plows being designed to loosen the earth adjacent the beets and assist in the raising of the same.

Rigidly connected through rods 6 with the standards 5 is a transverse toothed knife blade 7 that is disposed in advance of the plows and has for its function to cut heavy foliage from the tops of the beets.

The forward portion of the body 1 is supported by ground wheels 11 which may be connected with the body in the conventional or any other approved manner.

It will be observed that the standards 5 which extend upward through openings 13 in the body 1 are provided with rack teeth 14. These rack teeth are designed for the engagement of spur gears 15 fixed on a shaft 16, suitably supported on the body 1; the said shaft 16 being also provided with a hand wheel 17 and a ratchet disk 18, the latter for the engagement of a dog 19, adapted to prevent casual retrograde rotation of the shaft. By rotating the shaft 16 in one direction, the plows 4 can be raised to the extent desired, the dog 19 serving to maintain the plows in the position to which they are raised. It will also be noted that when the dog 19 is held out of engagement with the ratchet the plows can be permitted to gravitate or can be moved down to the position desired.

Pivoted to and extending upward and rearward from the lower portions of the plow standards 5 are curvilinear braces 20. These braces have beveled teeth on their rear edges and are extended upwardly through openings 21 in the body 1. The teeth on the braces are designed to be placed in engagement with the rear walls of the openings 21, at the underside of body 1, with a view to bracing the plows when the latter are positioned at various points below the body 1.

23 is a transverse shaft disposed above the rear portion of the opening 2 in body 1 and equipped with fast sprocket gears 24. 25, 25 are vertically swinging frame sides pivotally mounted at 25ˣ and extending downwardly and forwardly therefrom below the body or frame 1.

26 is a transverse shaft journaled in the lower and forward portions of the frame sides 25 and bearing sprocket gears 27.

28, 28, are curvilinear steadying rods pivotally connected to the shaft 26 and extending loosely through openings 29 in the body 1, and 30 is an endless apron mounted on and constructed to engage the teeth of the sprocket gears 24 and 27, and to be driven by the said gears 24. The rods 28 serve to brace the forward portion of the apron and its frame when the machine is in operation, and this without interfering with the forward end of the frame being raised and lowered as occasion demands. The raising of the said frame is accomplished through the medium of chains or other cables 31 connected to the frame sides 25 and passed through openings 32 in body 1, and connected to the shaft 16 and designed to be wound thereon when said shaft is rotated to raise the plows 4. From this it follows that the forward end of the apron frame will be raised and will be lowered or permitted to gravitate synchronously with the plows 4.

The apron 30 is preferably, though not necessarily, formed of connected steel links, and to the same are attached the beet lifters 33. These latter are bifurcated to enable them to straddle the beet bulbs below the upper large portions thereof, so as to lift the beets from the earth and carry the same upwardly and rearwardly on the upper stretch of the apron 30.

A transverse idler roller 34 is mounted between the frame sides 25 in rear of the sprocket gears 27, and is disposed above the lower stretch of the apron 30, as shown, in order to hold each of the lifters 33 to its work as the same is presented to a beet. I would also have it understood in this connection that I prefer to provide the shaft 23 and the shaft 26 with rollers 40 and 41, respectively; the said rollers being arranged intermediate the gears 24—24 and the gears 27—27, respectively, and being designed to support the apron 30.

In the present and preferred embodiment of my invention the body 1 is supported by wheels; the rear wheels 42 being fast on a shaft 43, journaled in suitable bearings carried by the body. Incidental to forward movement of the machine motion is transmitted from the shaft 43 to the shaft 23 through the medium of a clutch member 44 fast on shaft 43, a sprocket gear 45, loosely mounted on the shaft 43 and movable in the direction of the length thereof and having a clutch member 46 opposed to the clutch member 44, a shaft 47 carried by the body 1 and having a sprocket gear 48 and a spur gear 49, a gear 50 fixed on the apron shaft 23 and intermeshed with the gear 49, and a sprocket belt 51ª mounted on and connecting the sprocket gears 45 and 48. In order to enable the driver or any other attendant of the machine to conveniently establish and interrupt the said driving connection between wheel shaft 43 and apron shaft 23, I preferably employ the mechanism shown, which comprises a segmental rack 50ʷ fixed on the body 1, a hand lever 51 fulcrumed at an intermediate point of its length on the body 1 and having a detent whereby it can be adjustably fixed to the rack 50ʷ, a suitably-supported bell-crank 52 having one of its arms bifurcated and arranged in straddling relation to a circumferentially-grooved collar on the sprocket gear 45, and a rod 53 connecting the other arm of the bell-crank 52 with the lower arm of the hand-lever 51. Obviously when the machine driver or other attendant desires to drive the apron 30 from the shaft 43 it is simply necessary for him to throw the upper arm of the lever 51 in one direction and adjustably fix it to the rack 50ʷ when the clutch member 46 on sprocket gear 45 will be placed and retained in engagement with the clutch member 44. On the other hand when the attendant desires to disengage the clutch member 46 from the clutch member 44 and thereby stop the apron 30, as when the machine is to be moved from one field to another, it is simply necessary for him to throw the upper arm of the lever 51 in the opposite direction.

While I prefer to employ the means just described for driving the apron 30 and controlling the same, I do not desire to be understood as confining myself to said means as any other means for the purpose may be employed without involving departure from the scope of my invention as claimed.

Fixed to and rising up from the body 1 is a plate 60 having a ledge 61 and vertical slots 63 and 64.

65 is a vertically-movable plate that normally rests on the ledge 61 and is provided with an aperture 66.

67, 67, are pulleys carried by the plate 65 and arranged and movable vertically in the slots 64 of the plate 60.

68 is a bolt carried by the plate 65 and extending through and movable vertically in the slot 63 of plate 60.

69 is a hood carried by the upper portion of the plate 65 and extending forwardly therefrom.

70 is a sleeve fixed at its forward end in the aperture 66 of plate 65 and extending rearward through and movable vertically in the slot 63 of the plate 60.

71 is an endwise-movable shaft extending through the sleeve 70 and having an enlargement 72 at its rear end and a socket 73 in its forward portion.

74 is a pulley fixed on the shaft 71 and disposed in front of the sleeve 70.

75 is an expansion spring that surrounds the shaft 71 and is interposed between the rear end of the sleeve 70 and the shaft enlargement 72.

76, 76 are oppositely directed knife blades having shanks 77, of angular form in cross-section, socketed in the shaft 71; the said blades being each preferably twisted to a slight extent to enable them to better cut the tops from beet bulbs.

79, 79, are tubular uprights fixed to and rising from the body 1 at opposite sides of the opening 3. 80, 80, are coiled springs disposed in the lower portions of said tubular uprights.

81, 81, are vertically movable upright rods guided in the tubular uprights 79 and bearing at their lower ends on the springs 80.

82, are flanged pulleys carried by the rods 81, and 83 is a belt that is driven by means hereinafter described and is passed through the opening 3 and over pulleys 82 and 67 and around the pulley 74 to rotate the shaft 71 and the knife blades 76 carried by said shaft.

When a beet bulb to be topped is placed in the cup, presently described, the top part of the bulb, when the bulb is larger than a certain predetermined size, slides under the flared edge of the hood and raises the same together with the plate 65 and the knife blades to the center of the beet bulb irrespective of the size thereof. When the hood 69, plate 65, sleeve 70 and blade-bearing shaft 71 are raised as stated the springs 80 in the tubular uprights 79 will expand and thereby raise the pulleys 82 and take up slack of the belt 83, while when the plate 65 and the parts carried thereby gravitate to their normal positions the springs 80 will be compressed under the action of the rods 81. I would also direct attention here to the fact that the shaft 71 and the bore in the sleeve 70 are of spiral configuration and hence when the shaft and the topping means thereon are rotated as stated, the shaft and the topping means will be moved forwardly to enable the topping means to better engage the tops of a presented beet and cut the same from the bulb. When the rotation of the shaft 71 and the topping means is stopped, as hereinafter described, the spring 75 expands and thereby moves the shaft 71 and the topping means backward to their normal positions; the shaft during said movement rotating in reverse direction.

The belt 83 is passed around and driven through the medium of a pulley 85, loosely mounted and movable endwise on the wheel shaft 43 and carrying a clutch member 87. Fixed on the shaft 43 is a complementary clutch member 88. The shaft 43 is provided with a fast spur gear 43$^x$ that is intermeshed with a gear 43$^y$ on a suitably supported transverse shaft 86, hereinafter specifically referred to.

It is desirable that the topping means, specifically the knife blades 76, be rotated only when a beet is presented to said means, and to this end I provide the resilient rod 92 which serves to move and yieldingly hold the loose pulley 85 with its clutch member 87 out of engagement with the complementary clutch member 88 that is fast on the continuously rotating shaft 43. In order to move and hold the pulley 85 into engagement with the clutch member 88 and thereby effect rotation of the topping means when a beet is presented by one of the lifters and holders 33 for topping, I provide tappets 97 on the apron 30, one tappet to each beet lifter and holder 33, and I also provide a suitably supported bell-crank 98, a cable 99 connecting one arm of the same with the resilient rod 92, and a lever 100 journaled at intermediate points of its length and having a long arm connected with the other arm of the bell-crank 98, and a short arm relatively arranged to be engaged and moved by each tappet 97 as the same passes. On movement and retention of the lever 100 by each tappet 97 it will be manifest that the rod 92 will be driven inward and the pulley 85 will be placed and held in engagement with the clutch member 88, and hence the topping means will be rotated so long as the tappet remains in engagement with the arm of lever 100. When, however, the tappet 97 moves out of engagement with lever 100, the spring rod 92 will return to its normal position and by so doing will disengage the pulley 85 from the clutch member 88 and stop the rotation of the topping means until the lever 100 is engaged and moved by the succeeding tappet 97. At this point I would direct attention to the fact that the intermittent rotation of the topping means by the means described or any other means compatible with the purpose of my invention, is essential to the materially advantageous forward movement and retraction of the topping means hereinbefore described.

Fixed on the body 1 and spaced a slight distance in front of the plates 60 and 65 is a plate 110 that has a notch 111 in its upper edge and carries a forwardly extending cup 112, the rear end of which communicates with the notch.

120 is a transverse shaft suitably supported at the underside of the body 1.

121 is a circumferentially grooved pulley loosely mounted on the shaft 120 and held against endwise movement and having a clutch member 122.

123 is a pulley mounted to turn with and be moved endwise on the shaft 120 and having a clutch member 124 opposed to the clutch member 122 and also having a circumferentially-grooved portion 125.

126 is a belt connecting the pulley 89 on shaft 86 with the pulley 123 on the shaft 120.

127 is a resilient or spring rod that engages the circumferentially-grooved portion 125 of the pulley 123 and tends to move and yieldingly hold said pulley 123 out of engagement with the clutch member of the pulley 121.

128 is a rectilinearly-movable rod, suitably guided at 129 and designed to move the rod 127 to place the driven pulley 123 into engagement with the loose pulley 121.

130 is a suitably supported arm connected with the rod 128, and 132 is a lever suitably supported and carrying the arm 130. The said lever 132 is also provided with an arm relatively arranged to be engaged by the tappet 97 complementary to each beet lifter and holder 33 after said tappet engages the short arm of the lever 100 to put the topping means in operation in the manner before described.

140 is a rack bar movable horizontally inward and outward on the face of the plate 110.

141 is a gear segment intermeshed with the rack bar 140, and pivoted at 142 on the face of the plate 110, and having an arm 143 extending downwardly through a transverse slot 144 in the body 1, and 145 is a cable, preferably in the form of a chain, connected at its ends to the arm 143 and pulley 121 and passed over an anti-friction roller 146 arranged adjacent the pulley 121. By virtue of this construction, it will be manifest that when the pulley 121 is rotated by the means before described, the cable 145 will be taken up on the pulley 121 and through said cable the gear segment will be rocked in the direction indicated by arrow to move the rack bar 140 rectilinearly outward. It will also be manifest that when the pulley 121 is unclutched or rendered loose on the shaft 120, the rack bar 140 will be moved rectilinearly inward by the retractile spring 150.

The rack bar 140 is provided at its inner end with fingers 160, designed to remove a topped beet from the cup 112 when the rack bar is reciprocated.

It will be gathered from the foregoing that my novel machine is adapted when moved forwardly to take beets from the ground, elevate the beets, and then top the same, and this expeditiously and without injuring the beet bulbs.

I have entered into a detailed description of the construction and relative arrangement of the parts embraced in the present and preferred embodiment of my invention in order to impart a full, clear, and exact understanding of the same. I do not desire, however, to be understood as confining myself to the said specific construction and relative arrangement of parts as in the future practice of my invention such changes or modifications may be made as fairly fall within the scope of my invention as claimed.

Having described my invention, what I claim and desire to secure by Letters-Patent, is:

1. The combination of ground-loosening means, means for taking beets from the ground and elevating the same, means for topping the beets so elevated, means for actuating the topping means, means for advancing the topping means incidental to the actuating thereof, and means for retracting the topping means.

2. The combination of beet-topping means, means for actuating the same, means for advancing the beet-topping means while the same are being actuated, and means for retracting the topping means subsequently to the actuating thereof.

3. The combination of rotary beet-topping means, means for rotating the same, means for advancing the beet-topping means incidental to rotation thereof, and means for retracting the topping means subsequently to said rotation thereof.

4. The combination of rotary beet-topping means, means for intermittently rotating the topping means, means for advancing the beet-topping means incidental to the said rotation thereof, and means for retracting the topping means in the intervals between the said rotations thereof.

5. The combination of rotary beet-topping means, means for intermittently rotating the topping means, means for advancing the topping means incidental to said rotations thereof, means for retracting the topping means in the intervals between the rotations thereof, a cup for holding beets during the topping thereof, means for presenting beets to the topping means and the cup, and means for removing beets from the cup subsequently to the topping of the beets.

6. The combination of beet-lifting and elevating means, rotary beet-topping means, a cup for holding beets incidental to the topping thereof, means for displacing topped beets from the cup, means for rotating the topping means, and means for actuating the displacing means; said rotating and actuating means being controlled by the beet-lifting and elevating means.

7. The combination of means adapted to receive a beet to be topped, means for presenting beets to said receiving means, a vertically-movable hood disposed over the said receiving means, and rotary topping means connected and movable vertically with said hood, for the purpose set forth.

8. The combination of means adapted to receive a beet to be topped, means for presenting beets to said receiving means, a vertically-movable hood disposed over the said receiving means, a plate connected and movable vertically with said hood and carrying pulleys, a shaft carrying topping means and a pulley; said shaft being movable vertically with said plate, a belt passed around the pulley of the shaft and over the pulleys of the plate, and means for driving said belt.

9. The combination of means adapted to receive a beet to be topped, means for presenting beets to said receiving means, a vertically-movable hood disposed over the said receiving means, a plate connected and movable vertically with said hood and carrying pulleys, a shaft carrying topping means and a pulley; said shaft being movable vertically with said plate, a belt passed around the pulley of the shaft and over the pulleys of the plate, means for driving said belt, and a spring-pressed pulley for taking up slack of the belt.

10. The combination of a fixed sleeve and a shaft rotatable and movable endwise in the sleeve; the bore of the sleeve and the shaft being provided with corresponding spirals, whereby rotation of the shaft in one direction will be attended by advancement thereof, means for so rotating said shaft, means for retracting the shaft, and topping means on the shaft.

11. The combination of beet-receiving means, means for delivering beets to the receiving means, means for displacing beets from said receiving means, and means for operating the displacing means; said operating means being controlled by the delivering means.

In testimony whereof I have hereunto set my hand in presence of two subscribing witnesses.

JOHN DUVAL.

Witnesses:
 LENA MACBAIN,
 ORM B. TRUMBO.